Feb. 10, 1948.    B. M. OLIVER    2,435,598
ELECTRIC PULSE DELAY CIRCUIT
Filed Dec. 28, 1943    5 Sheets-Sheet 1

INVENTOR
B. M. OLIVER
BY
*G. F. Heuerman*
ATTORNEY

INVENTOR
B. M. OLIVER
BY
G. F. Heverman
ATTORNEY

Patented Feb. 10, 1948

2,435,598

UNITED STATES PATENT OFFICE 2,435,598

ELECTRIC PULSE DELAY CIRCUIT

Bernard M. Oliver, New York, N. Y., assignor to Bell Telephone Laboratories, Incorporated, New York, N. Y., a corporation of New York Application December 28, 1943, Serial No. 515,904

18 Claims. (Cl. 250—27)

This invention relates to electrical circuits and particularly to pulse delay circuits.

An object of the invention is to provide an improved pulse delay apparatus.

A further object of the invention is to provide improved means for producing a series of output pulses which are delayed by variable, accurately controlled delay intervals with respect to corresponding pulses of a series of input pulses.

The invention is of use, for example, in a system for determining the range of a distant object such as disclosed in an application of L. A. Meacham, Serial No. 491,791, filed June 22, 1943 (patent No. 2,422,204, June 17, 1947). In a system of the type therein described, the delay period between a pulse of a series of radiated pulses and the received echo of that pulse is a measure of the distance to the object and this delay period may be determined by producing a series of pulses which are delayed by known variable amounts with respect to corresponding radiated pulses and varying the delay until the delayed pulses so produced are coincident with corresponding echo pulses. In that system, as well as in the arrangement of the present invention, the starting or reference pulses and the delayed pulses are preferably of short duration compared to the intervals between successive pulses of each series and compared to the range over which the delay between starting pulses and corresponding delayed pulses may be varied. If desired, however, pulses of relatively long duration may be produced and the interval between the beginnings of the starting pulses and the beginnings of corresponding delayed pulses varied over a desired range.

In radar systems, as well as in systems of many other types, it is important that the delays produced by the pulse delay circuit be accurately determined by a few passive circuit elements, and not influenced by such factors as the magnitude of the pulses in the input series, the supply voltages and variations in other circuit components such as the vacuum tubes. In the several embodiments disclosed in this application this independence is achieved by using for a timing means a voltage transient, produced by a few passive elements in the circuit, and which passes through an initial or reference potential at a time after its initiation which is independent of the amplitude of the transient. Since most circuit changes affect only the amplitude of the transient, the desired independence is achieved. In one embodiment of the invention herein disclosed a desirable transient is produced by the action of two tandem resistance-capacity or RC circuits with substantially equal time constants and in a second embodiment a single resistance-capacity circuit is utilized, a discharge circuit for the capacity element through the resistance being completed through the direct potential source which charges the condenser, the polarity of the battery on discharge with respect to the condenser being the reverse of that during the charging period.

In the second of these embodiments, which is the preferred one, there is provided a circuit arrangement for producing a series of output pulses which are delayed by an interval which may be varied with respect to corresponding pulses of a series of input or reference pulses. A condenser in the circuit is charged prior to the occurrence of each input pulse and, when an input pulse occurs, a circuit is completed in response to the input pulse for causing the condenser first to be discharged and then to be recharged. Means are provided for producing a delayed output pulse at substantially the time that the charge on the condenser is at its minimum value, that is, when the discharging is completed and the recharging begins. The circuit through which current flows to change the charge on the condenser preferably comprises in series a source of direct voltage, a resistor, the condenser and the anode-cathode path of an electronic device, the resistance of which is reduced to a very low value due to the occurrence of an input or reference pulse, the voltage to which the condenser has been charged by current from the voltage source prior to the occurrence of the reference pulse being in aiding relationship with respect to the voltage source in the series circuit. As a result of the current flow in this series circuit, the voltage across the condenser is first reduced to zero and then caused to increase in the reverse direction. The output pulse is produced when the voltage across the condenser is approximately zero, the delay interval between a reference pulse and a corresponding output pulse being determined by the time constant of the series circuit and being independent of other factors, such as voltage variations of the supply source. This delay interval may be varied by changing the capacity of the condenser or by changing the resistance of the resistor in the series circuit to vary its time constant.

Fig. 1 of the accompanying drawing is a diagrammatic view of a system for producing a series of output pulses which are delayed with respect to corresponding pulses of a series of reference pulses;

Fig. 6 is a diagram to which reference will be made in explaining the operation of the circuits shown in the preceding figures.

Figure 1:
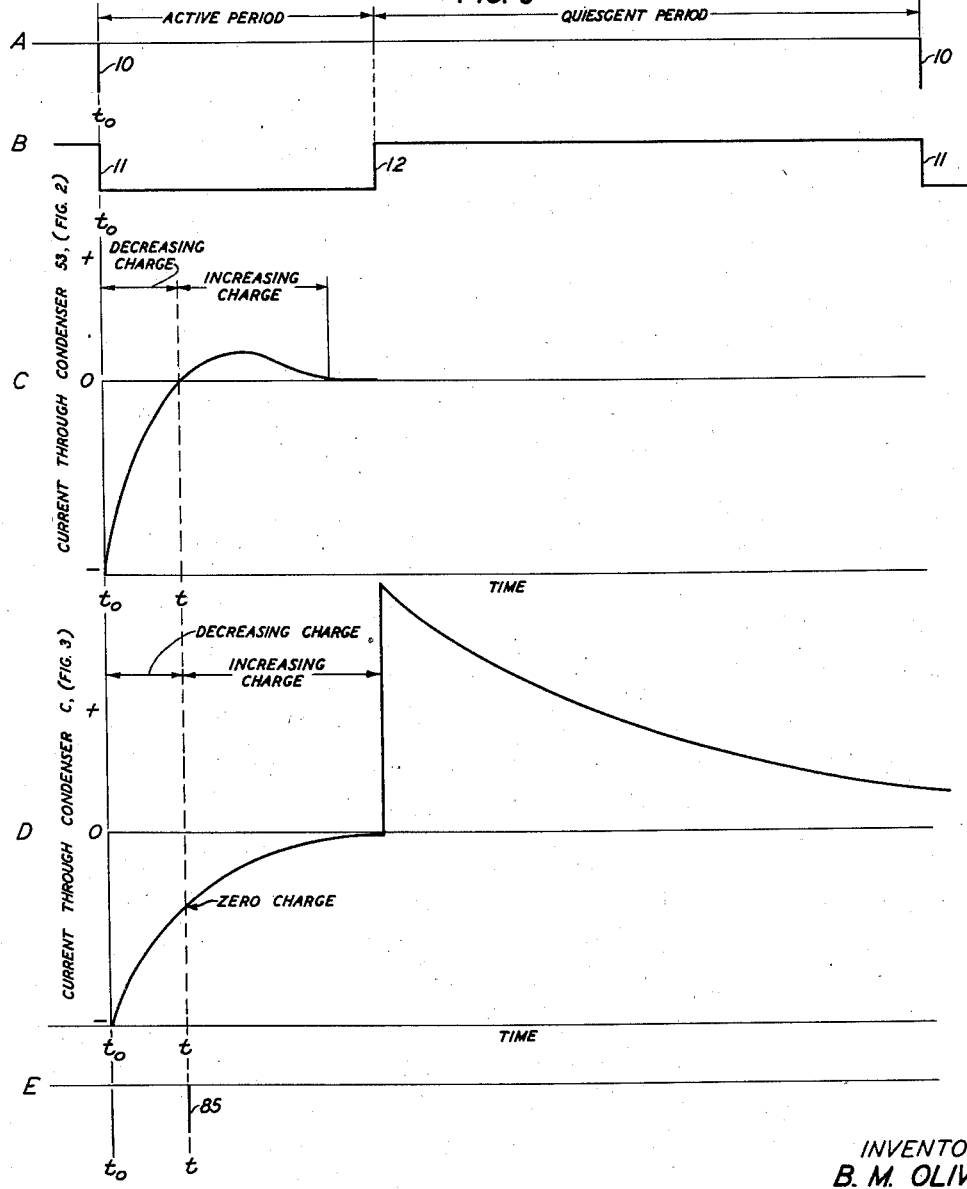

As shown in Fig. 1, there is provided a starting pulse generator 1, which may be of the type disclosed in the application of L. A. Meacham, supra, for producing pulses 10 as shown at A, Fig. 6, which pulses may recur periodically or aperiodically and which are of brief duration with respect to the intervals separating the successive pulses. The starting pulses are impressed upon a start-stop circuit 2 which produces a wave as shown at B, Fig. 6 having a negative step 11 coincident with a starting pulse 10 and a positive step 12 produced prior to the time of occurrence of a succeeding starting pulse, the period between the negative step 11 and the positive step 12 being designated the "active period" and the interval between successive active periods being designated the "quiescent period." The start-stop wave B is impressed upon a RC delay circuit 3 to cause current to flow through a path including a condenser to cause the charge on the condenser to decrease during a period which commences with the occurrence of a starting pulse 10 and the negative step 11 and to subsequently increase during each active period as indicated at C and D of Fig. 6. The interval between the time $t_0$ when a starting pulse occurs and the time $t$ when the charge on the condenser reaches its minimum value is determined by the time constant of the path including the condenser, which time constant may be variable. The pulse generator 4 produces a delayed output pulse of desired shape at the time $t$ in each active period as indicated at E, Fig. 6.

Figure 2:
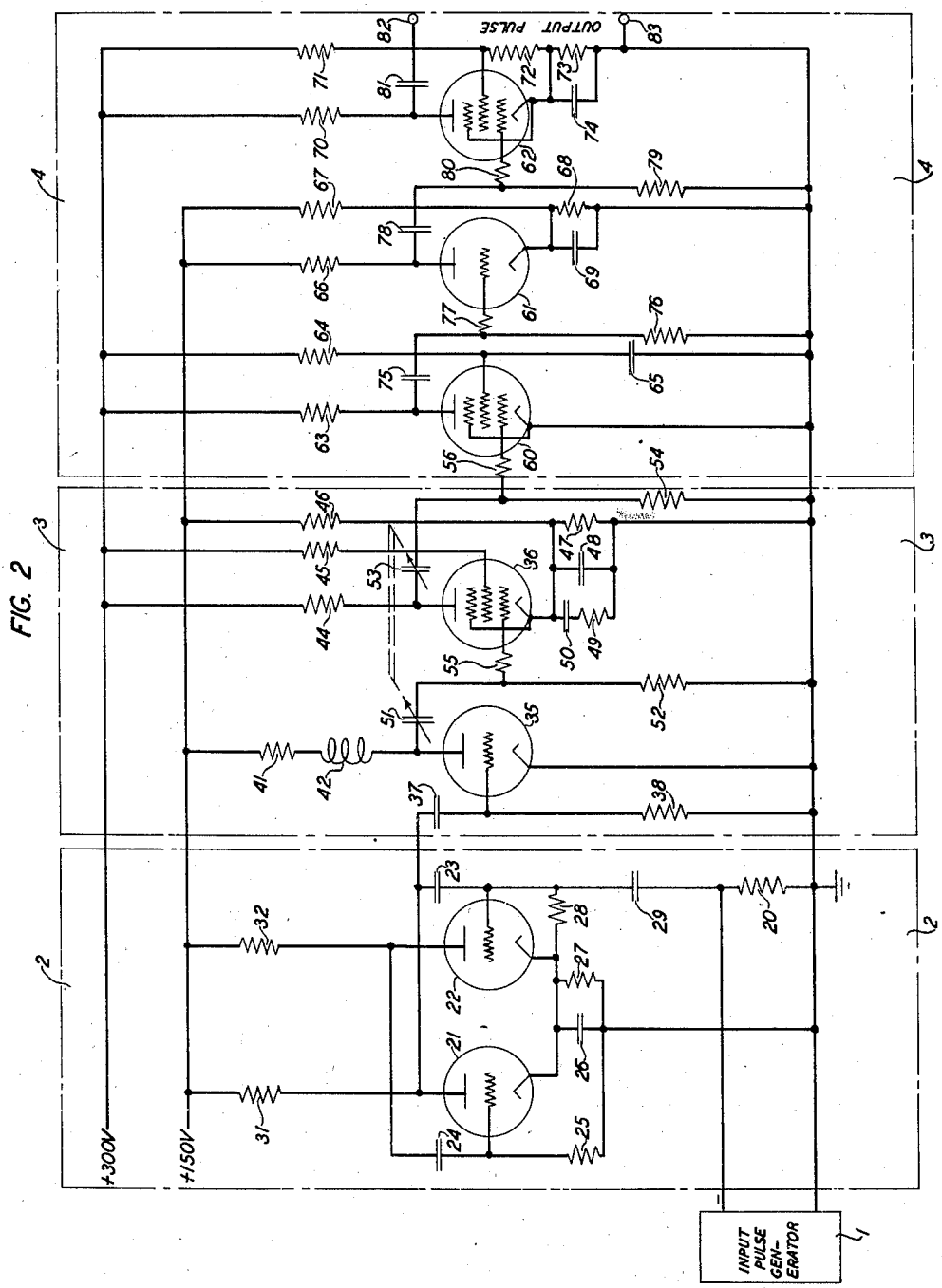
Fig. 2 is a schematic view of a pulse delay circuit as shown in Fig. 1 but in greater detail.

Referring now to Fig. 2 of the drawing, the pulses 10 produced by the input pulse generator 1 are impressed across 72-ohm resistor 20 of the start-stop circuit 2, one terminal of the resistor being grounded. This portion of the circuit comprises two triodes 21 and 22 connected as a single stroke multivibrator, or "monovibrator," the anode of tube 21 being connected through a 100-micromicrofarad condenser 23 to the control electrode of tube 22 and the anode of tube 22 being connected through a 0.01-microfarad condenser 24 to the control grid of tube 21. The grid of tube 21 is connected through 0.1-megohm resistor 25 to ground. The cathodes of tubes 21 and 22 are connected through a 25-microfarad condenser 26 and a 3,300-ohm resistor 27 in parallel to ground. The grid of tube 22 is connected through 0.1-megohm resistor 28 to the tube cathode and through 50-micromicrofarad condenser 29 to the ungrounded terminal of resistor 20. Anode voltage is supplied from the positive terminal of a 150-volt source, the negative terminal being grounded, through 22,000-ohm resistor 31 to the anode of tube 21 and through 22,000-ohm resistor 32 to the anode of tube 22. Tube 21 is normally non-conducting because the voltage across resistor 27 produced by the plate current of tube 22 and which is applied in a negative sense to the grid of tube 21 is sufficient to prevent plate current in tube 21. When the grid of tube 22 is made negative with respect to its cathode due to a pulse 10 from the starting pulse generator 1, anode current in tube 22 is reduced and, as a result, the grid of tube 21 becomes positive with respect to the cut-off bias of the tube to start conduction in tube 21. The potential at the anode of tube 21 is thus reduced to produce the negative step 11. Tube 21 remains conducting and its grid is held slightly positive by the current flowing through condenser 24 and resistor 32. When condenser 23 has discharged sufficiently through resistor 28, tube 22 becomes conducting which cuts off tube 21 to produce the positive step 12 at the anode of tube 21. The resulting start-stop wave B of Fig. 6 is applied to the RC delay circuit 3 of Fig. 2 comprising triode 35 and pentode 36 through an 0.01-microfarad condenser 37. The common terminal of condenser 37 and resistor 38 is connected to the grid of tube 35 and the cathode of the tube and one terminal of resistor 38 are grounded.

Anode voltage is applied from a 150-volt source through 2,200-ohm resistor 41, 100 millihenry inductance coil 42 to the anode of tube 35. Voltage is applied from the positive terminal of a 300-volt source, the negative terminal being grounded, 3,900-ohm resistor 44 to the anode of tube 36 and from this source through 56-ohm resistor 45 to the screen grid of the tube. Voltage dividing resistors 46 (22,000 ohms) and 47 (3,300 ohms) are connected in series across the 150-volt source and the common terminal of these resistors is connected to the cathode of tube 36 to maintain it at a positive potential with respect to ground. In shunt with resistor 47 is an equalizer circuit, one branch of which consists of an 0.002-microfarad condenser 48 and the other branch of which consists of 220-ohm resistor 49 and 50-microfarad condenser 50 in series. The anode of tube 35 is connected through variable condenser 51 and 70,000-ohm resistor 52 in series to ground and the anode of tube 36 is connected through variable condenser 53 and 70,000-ohm resistor 54 to ground, the rotors of condensers 51 and 53 being on a common shaft so that the capacity of the condensers may be varied simultaneously by the same amount. The common terminal of condenser 51 and resistor 52 is connected through 100-ohm resistor 55 to the control grid of tube 36. The resistor 55 is known as an "anti-sing" resistor and is used to damp high frequency oscillations, that is, to prevent singing. Other similarly connected resistors are used in the circuits described herein for this purpose. The voltage across resistor 54 is impressed upon the output pulse generating circuit 4 comprising tubes 60, 61 and 62, the common terminal of condenser 53 and resistor 54 being connected through 100-ohm resistor 56 to the control grid of tube 60 and the cathode of tube 60 being grounded.

At the time $t_0$, as shown in Fig. 6, the grid of tube 35 becomes negative with respect to its cathode to stop conduction of anode current through the tube and condenser 51 is charged from the 150-volt source. Due to the resulting voltage drop across resistor 52, tube 36 suddenly becomes conducting and condenser 53 starts to discharge. While the voltage across condenser 53 is decreasing due to the discharging, the voltage between the anode of tube 36 and ground is increasing because the plate current of tube 36 decreases as the voltage drop across resistor 52 decreases due to the charging of condenser 51. Thus, as shown at C in Fig. 6, the discharge current through condenser 53 and resistor 54 goes to a large amplitude at time $t_0$ and decreases until zero current is reached at time $t$ when the voltage measured between the grid of tube 60 and ground is zero. The current through condenser 53 then reverses to increase the charge on this condenser as the potential of the anode of tube 36 with respect to ground further increases. Most of this current is drawn as grid current in tube 60.

The delay period between $t_0$ and $t$ is dependent upon the time constant of the circuit through which current flows to change the charge on condenser 51 and the time constant of the circuit through which current flows to change the charge on condenser 53, the time constants of these two circuits being substantially equal. The time constant of these circuits may be changed by varying the capacity of the variable condensers 51 and 53 or, if desired, by varying the resistance of resistors 52 and 54. If the time constant of each of these circuits is $1/\alpha$ and a negative step function is impressed across resistor 38 at time $t_0=0$, then the voltage $e_1$ across resistor 52 will be $$e_1 = \frac{p}{p+\alpha} I_1 R_1 1 = \frac{p}{p+\alpha} E_1 1 = \epsilon^{-\alpha t} E_1 1$$

where $p$ is the differential operator $$\frac{d}{dt}$$

where the negative step function applied to the grid-cathode circuit of tube 35 gives rise to the current step function $I_1 1$ in the space current path of tube 35, where $R_1$ is the resistance of resistors 41 and 52 in parallel and where $E_1$ is equal to $I_1 R_1$. If the amplification of the stage involving tube 36 is $\mu_2$, the voltage $e_2$ across resistor 54 is $$e_2 = -\mu_2 \frac{p}{p+\alpha} \epsilon^{-\alpha t} E_1 1$$

$$= -\mu_2 \epsilon^{-\alpha t} \left(1 - \frac{\alpha}{p}\right) E_1 1$$

$$= -\mu_2 (1 - \alpha t) \epsilon^{-\alpha t} E_1 1$$

The voltage $e_2$ across resistor 54 is equal to zero prior to the time $t_0=0$. Subsequently, $e_2$ again becomes equal to zero when $(1-\alpha t)$ becomes equal to zero, that is, when $$t = \frac{1}{\alpha}$$

It is seen, therefore, that the time delay period $t$ required for the current in the path comprising condenser 53 and resistor 54 to reach zero is equal to the time constant of the circuit and is independent of the amplitude of the applied voltage step, and of $E_1$ and $\mu_2$ provided $E_1$ and $\mu_2$ are constant.

Anode voltage is supplied to tube 60 of the output pulse generator 4 from the 300-volt source through 33,000-ohm resistor 63. Screen grid voltage is supplied to tube 60 from 300-volt source through 0.27-megohm resistor 64, the screen grid being connected through 0.1-microfarad condenser 65 to ground. Anode voltage is supplied to tube 61 from 150-volt source through 3,900-ohm resistor 66. Potential dividing resistors 67 (0.22 megohm) and 68 (22,000 ohms) are connected in series across the 150-volt supply, resistor 68 being shunted by 0.1-microfarad condenser 69 and the common terminal of resistors 67 and 68 being connected to the cathode of tube 61. Anode voltage is supplied to tube 62 from the 300-volt source through 0.1-megohm resistor 70. Potential dividing resistors 71, 72 and 73 are connected in series across the 300-volt source, resistor 73 being shunted by 250-micromicrofarad condenser 74. The resistance values of resistors 71, 72 and 73 are respectively 100 ohms, 0.56 megohm and 39,000 ohms. The anode of tube 60 is connected through 0.01-microfarad condenser 75 and resistor 77 to the grid of tube 61 and the common terminal of condenser 75 and resistor 77 is connected through 3.3-megohm resistor 76 to ground. The anode of tube 61 is connected through 150-micromicrofarad condenser 78 and 5,100-ohm resistor 80 to the grid of tube 62 and the common terminal of condenser 78 and resistor 80 is connected through 5,600-ohm resistor 79 to ground. The anode of tube 62 is connected through 0.01-microfarad condenser 81 to one output terminal 82, the other output terminal 83 being connected to ground. At time $t$ which is approximately when the polarity of the voltage across resistor 54 reverses to change the voltage on the grid of tube 60 from a negative to a positive value with respect to ground, tube 60 becomes conducting to make the voltage at its anode and the voltage at the grid of tube 61 relatively more negative or less positive. Because of the relatively long time constant of the coupling circuit comprising condenser 75 and resistor 76, a step pulse is produced across resistor 76. The condenser 78 is charged quickly to produce a short positive pulse at the control grid of tube 62. This pulse is amplified by the amplifier comprising tube 62 to produce at terminal 82 a delayed negative output pulse 85 as shown at E, Fig. 6.

Figure 3:
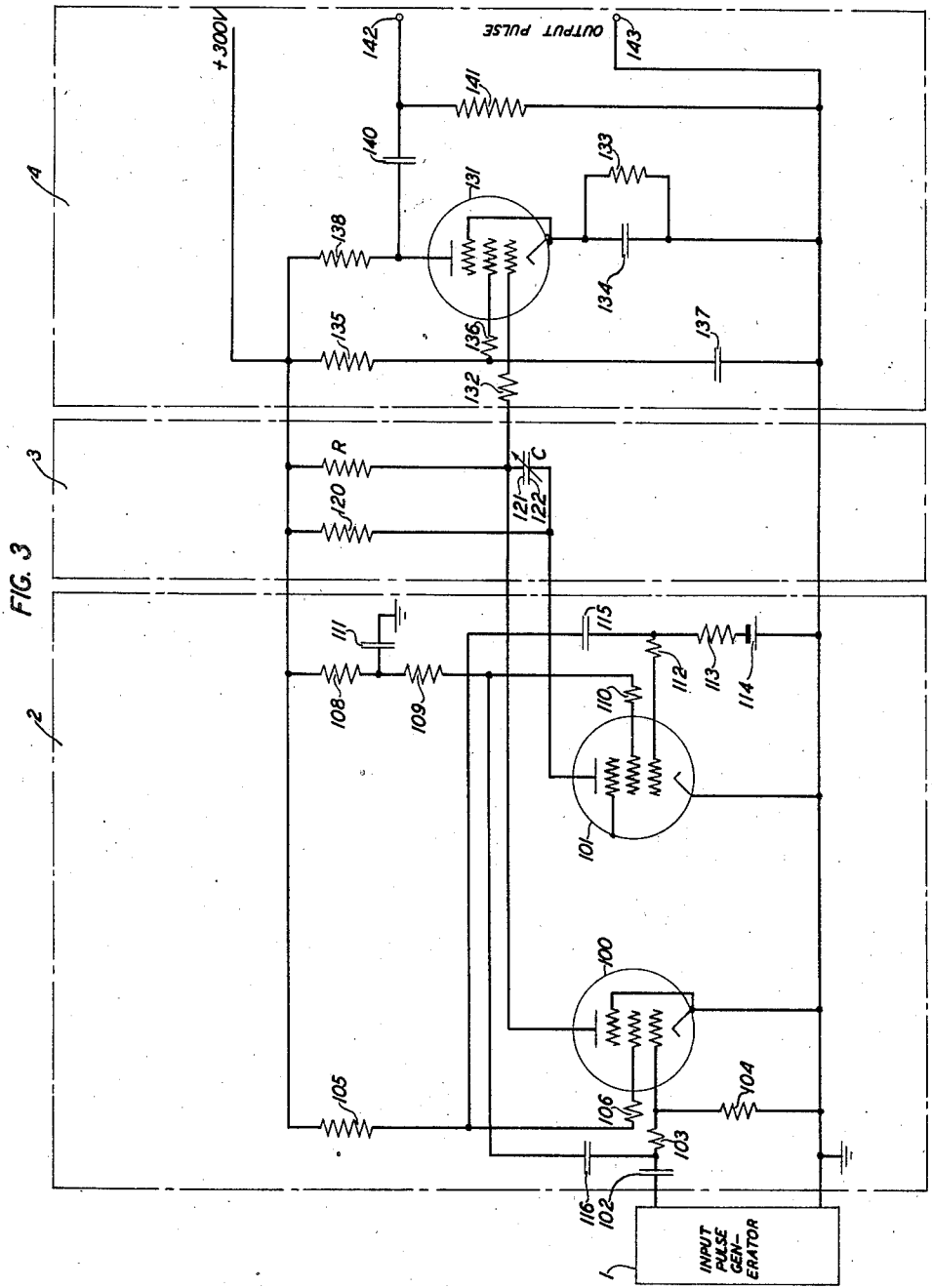
Fig. 3 is a schematic view of a pulse delay circuit which is a modification of the circuit shown in Fig. 2.

Referring now to the embodiment of the invention shown in Fig. 3, the reference pulses 10 from the input pulse generator 1 are impressed upon a monovibrator start-stop circuit 2 comprising tubes 100 and 101 for producing at the anode of tube 101 a start-stop wave as shown at B, Fig. 6. The negative reference pulses are impressed upon the grid of tube 100 through a circuit comprising in series 50-micromicrofarad condenser 102, 100-ohm resistor 103. A 0.1-megohm resistor 104 connects the grid of tube 100 to ground. Voltage from the positive terminal of a 300-volt source is impressed upon the screen grid of tube 100 through a 39,000-ohm resistor 105 and 47-ohm resistor 106, the negative terminal of the 300-volt source being grounded. Screen grid voltage for tube 101 is supplied from the 300-volt source through the series path comprising 47,000-ohm resistor 108, 1,000-ohm resistor 109 and 47-ohm resistor 110, a 0.5-microfarad filter condenser 111 being connected between the common terminal of resistors 108 and 109 and ground. The control grid of tube 101 is connected through 100-ohm resistor 112, 0.1-megohm resistor 113 and 25-volt biasing battery 114 to the grounded cathode to bias the control grid negatively with respect to the cathode. The screen grid of tube 100 is connected through resistor 106, 0.01-microfarad condenser 115 and resistor 112 to the control grid of tube 101 and the screen grid of tube 101 is connected through resistor 110, 100-microfarad condenser 116 and resistor 103 to the control grid of tube 100.

There is provided an RC delay circuit 3 comprising 0.1 megohm resistor 120 having one terminal connected to the positive terminal of the 300-volt source and the other terminal connected to the anode of tube 101, an 80,000-ohm resistor R having one terminal connected to the 300-volt source and the other terminal to the anode of tube 100, and a variable condenser C having one plate or set of plates 121 connected to the one terminal of resistor R and the anode of tube 100 and the other plate or set of plates 122 connected to the common terminal of resistor 120 and the anode of tube 101.

The RC delay circuit is connected to an output pulse generating circuit comprising a pentode electronic device 131. The plate 121 of condenser C is connected through 100-ohm resistor 132 to the control grid of tube 131 and the cathode of tube 131 is connected to ground through 2,200- resistor 133 and 25-microfarad condenser 134 in parallel. The positive terminal of the 300-volt source is connected through 0.22-megohm resistor 135 and 47-ohm resistor 136 to the screen grid of tube 131, the common terminal of resistors 135 and 136 being connected through 0.25-microfarad condenser 137 to ground. The anode of the tube is connected to the positive terminal of the 300-volt source through 33,000-ohm resistor 138 and is connected through 0.01-microfarad condenser 140 and 1-megohm resistor 141 to ground. The terminals of resistor 141 may be connected directly to the output terminals 142, 143 if a step output wave such as shown at B, Fig. 6, is desired. Where an output pulse of short duration as shown at E, Fig. 6, is desired, the terminals of resistor 141 may be connected to the output terminals through a circuit comprising tubes 61 and 62 as shown in Fig. 2, this portion of the circuit being omitted from Fig. 3 to avoid repetition. Since a step 11 may readily be produced under control of and coincidentally with a pulse 10 of brief duration and since a brief pulse 85 may be produced after a desired delay under control of and coincidentally with a step similar to the step 11, the term pulse will be used herein to refer generally to an abrupt voltage change whether the voltage, when the change occurs, returns to its original value after a brief interval to form pulses such as the pulse 10 or whether the voltage returns to its original value only after a relatively long interval to form a step wave as indicated at 11.

Tube 101 is normally non-conducting due to the negative bias applied to its control grid by battery 114. The control grid of tube 100 is normally at ground potential and therefore this tube conducts sufficient anode current to make its anode potential and likewise the control grid of tube 131 slightly positive with respect to ground. The bias produced due to space current flowing through resistor 133 will limit the space current in tube 131 to a few milliamperes. While tube 100 is conducting, condenser C will be charged by current from the 300-volt source through a circuit comprising resistor 120, condenser C and the anode-cathode path of tube 100 to ground. When the condenser has thus been substantially completely charged, condenser plate 122 will be about 300 volts positive with respect to the potential of plate 121. When tube 100 is made non-conducting due to a negative pulse 10 applied to its control grid at time $t_0$, a positive pulse is produced at the screen grid of tube 100 which pulse is impressed upon the control grid of tube 101 to make that tube conducting, its anode-cathode resistance being reduced to a low value. A negative step 11 is thus produced at the anode of tube 101, the potential at the anode of tube 101 being reduced to a value only slightly positive with respect to ground. The condenser C now first discharges to bring plates 121 and 122 to the same potential and subsequently charges to make plate 121 positive with respect to plate 122 through a circuit which may be traced from the positive 300-volt terminal through resistor R, condenser C and the anode-cathode path of tube 101, the voltage acting in this circuit at time $t_0$, being about twice the supply voltage or 600 volts. The diagram D, Fig. 6, indicates the relationship between the current flowing through condenser C and time. This current decreases from a large amplitude which it has at time $t_0$, as the voltage across the condenser first decreases during the interval between $t_0$ and $t$ and then increases in the reverse direction. At time $t$ the voltage across the condenser is reduced to zero, the delay interval between $t_0$ and $t$ being proportional to the time constant of the circuit through which current flows to change the charge on the condenser, this time constant being substantially equal to the resistance R multiplied by the capacity C. This interval may be varied by changing the capacity of the condenser C or, if desired, by varying the resistance of resistor R. Tube 131 is made non-conducting at the time $t_0$ due to the potential of the plate 121 of condenser C being reduced to about 300 volts negative with respect to ground, that is, at time $t_0$, plate 122 is near ground potential and plate 121 is about 300 volts negative with respect to the potential of plate 122. At time $t$ when the potential across condenser C is reduced substantially to zero, tube 131 again becomes conducting to produce a negative step voltage across the resistor 141, the coupling circuit including condenser 140 having a relatively long time constant. Naturally if a short output pulse is desired at these terminals, a short time constant coupling circuit may equally well be used.

Figure 4:
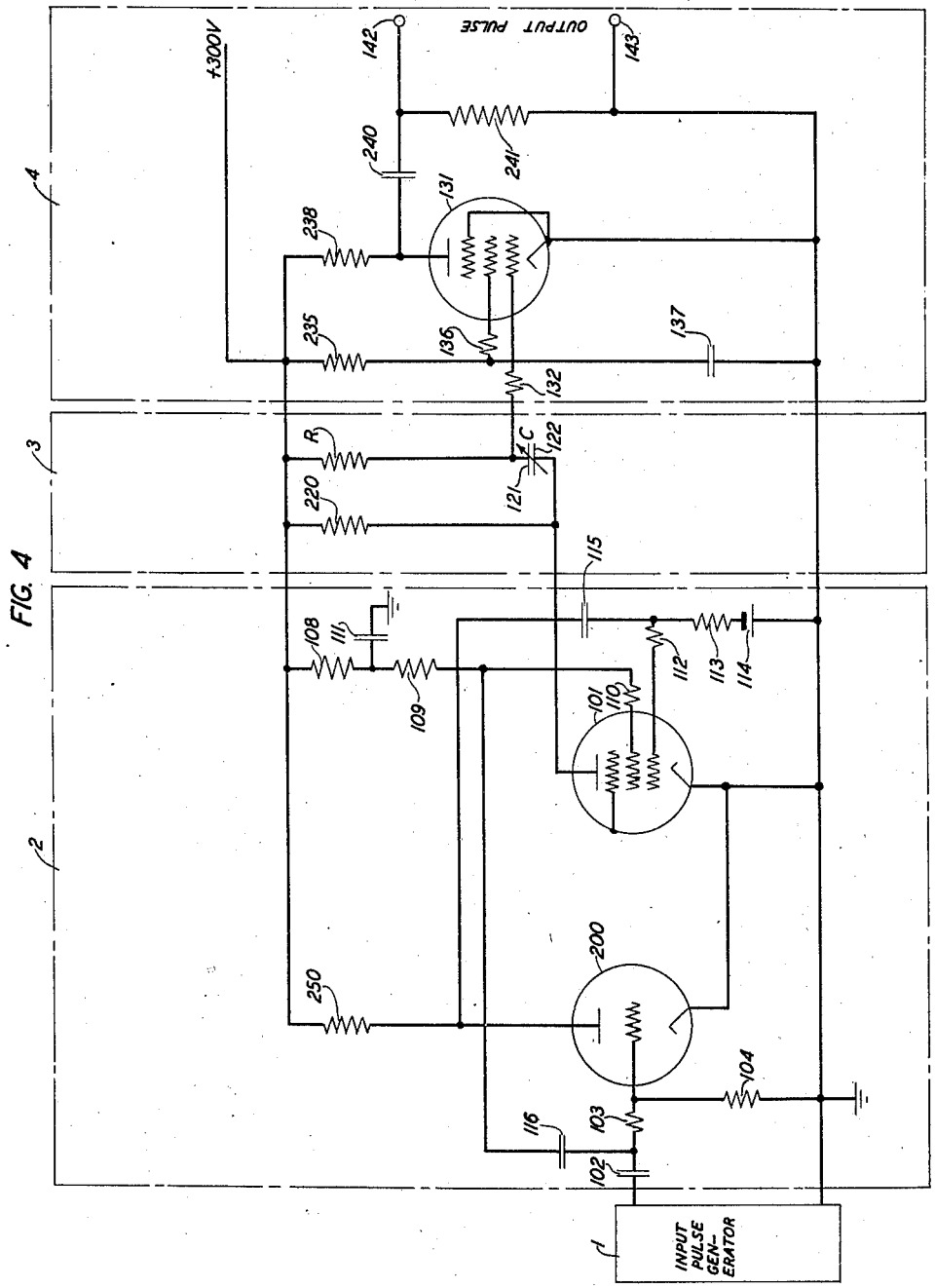
Fig. 4 is a schematic view of a pulse delay circuit which is a modification of the circuit arrangement shown in Fig. 3.

Fig. 4 shows a pulse delay circuit which is a modification of the circuit shown in Fig. 3 and the similar parts have the same designations in the two figures. There is employed a triode 200 having its anode connected to the positive 300-volt terminal through 56,000-ohm resistor 250 and having said anode connected through condenser 115 and resistor 112 to the control grid of tube 101. No connection is provided in Fig. 4 corresponding to the connection from the anode of tube 100 to the condenser plate 121 provided in Fig. 3. The resistor 220 has a resistance of 56,000 ohms, resistor 235 has a resistance of 0.27 megohm, resistor 238 has a resistance of 5600 ohms, resistor 241 has a resistance of 5600 ohms, and condenser 240 has a capacity of 100 micromicrofarads. The cathode of tube 131 is connected directly to ground.

In Fig. 4, before the production of a starting pulse 10, grid current flows in tube 131 from the 300-volt source through a circuit comprising resistor R and resistor 132 to hold the grid at a slightly positive potential. During this quiescent period, condenser C is charged by current from the 300-volt source through a circuit comprising resistor 220, condenser C, resistor 132, and the control grid-cathode path of tube 131 to ground, condenser plate 122 becoming about 300 volts positive with respect to plate 121. When a negative starting pulse 10 is impressed upon the grid of tube 200 to interrupt the anode current which normally flows in this tube, there is produced at the anode of tube 200 a positive pulse which is impressed upon the control grid of tube 101 to make that tube conducting, the anode-cathode resistance of tube 101 being reduced to a low value so that the potential of the anode of the tube and of condenser plate 122 is reduced to ground potential. Since the potential of condenser plate 121 is then about 300 volts negative with respect to ground, conduction in tube 131 is interrupted to produce a positive pulse at the output terminal 142 at time $t_0$. Current from the 300-volt source then flows through a circuit comprising resistor R, condenser C, and the anode-cathode path of tube 101, as shown at D, Fig. 6, to increase the potential of condenser plate 121 from about negative 300 volts to a positive potential with respect to ground. At time $t$ when the voltage across the condenser C is approaching zero, tube 131 again becomes conducting to produce a negative output pulse 85. In this embodiment the values of condenser 240 and resistor 241 have been chosen to give a short output pulse, but of course a long time constant coupling circuit can be used as in the previous embodiment if a step function output is desired.

It will be seen that in each of the embodiments of the invention depicted in Figs. 3 and 4 a condenser C is charged to an initial voltage prior to the time $t_0$ when a starting pulse 10 is applied to the circuit. When this starting pulse is applied, current is caused to flow through the RC circuit to change the charge on the condenser from the initial voltage of one polarity to a final voltage of opposite polarity, the voltage being changed exponentially. If the initial voltage to which the condenser is charged is V, and the applied voltage in aiding relationship to the initial voltage is E, the voltage $V_t$ across the condenser at time $t$ is $$V_t = E(1-\epsilon^{-\alpha t}) - V\epsilon^{-\alpha t}$$

where $$\alpha = \frac{1}{RC}$$

However V and E are due to the same voltage source so that $V=kE$. Therefore $$V_t = E(1-\epsilon^{-\alpha t}) - kE\epsilon^{-\alpha t}$$
$$= E[1-(1+k)\epsilon^{-\alpha t}]$$

When $V_t=0$, $$(1+k)\epsilon^{-\alpha t} = 1$$
$$\epsilon^{\alpha t} = 1+k$$
$$\alpha t = \log_\epsilon (1+k)$$
$$t = \frac{1}{\alpha} \log_\epsilon (1+k)$$
$$= RC \log_\epsilon (1+k)$$

When $V=E$, $k=1$ and $$t = RC \log_\epsilon (1+k) = 0.7RC$$

It is seen, therefore, that when $k$ is a constant, unity, for example, the delay interval $t$ between the time of an input pulse 10 and an output pulse 85 is independent of the source voltage E and depends only on the time constant RC of the circuit through which current flows to change the charge of the condenser.

Figure 5:
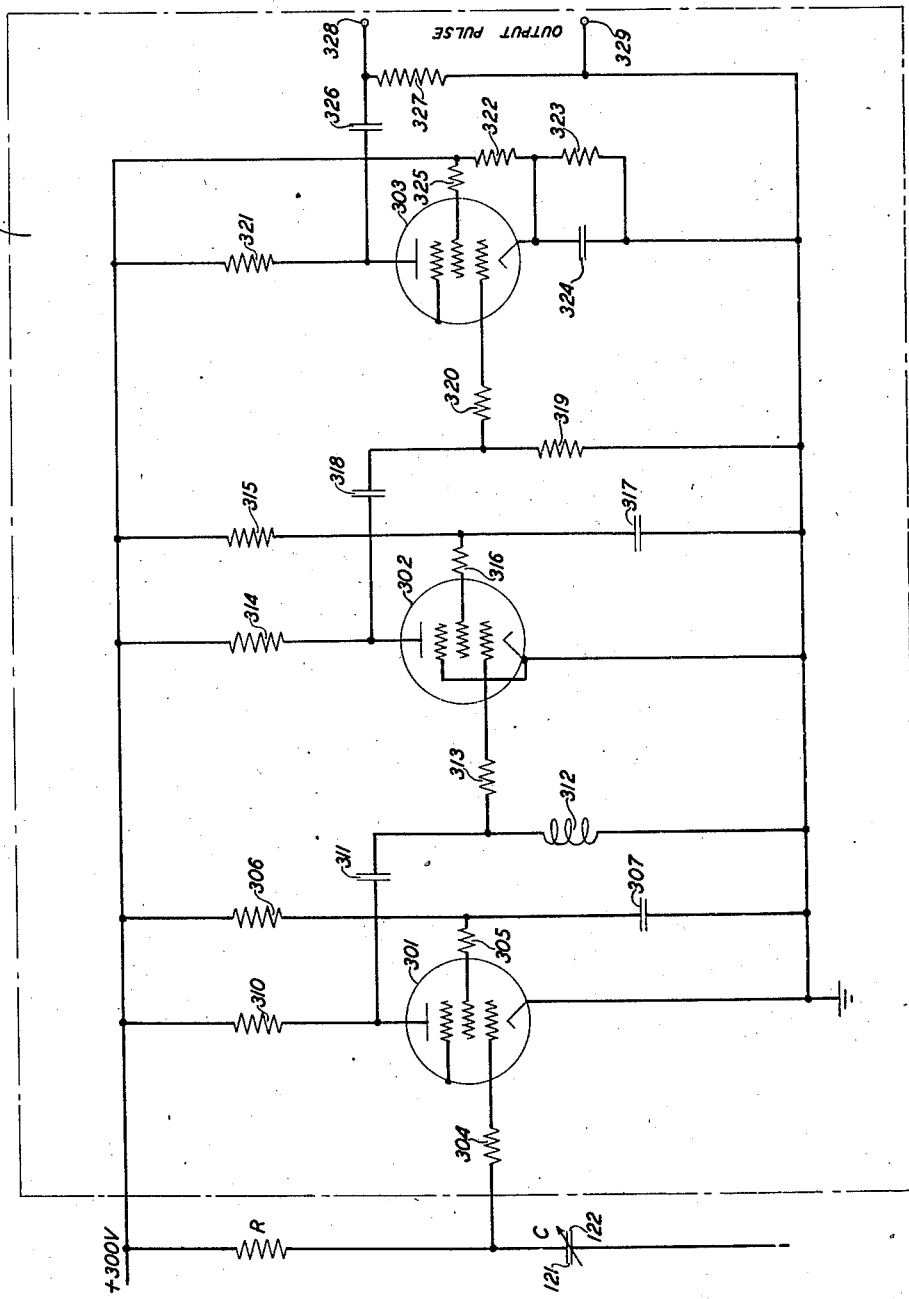
Fig. 5 is a schematic view of a modification of a portion of the circuits shown in Figs. 2, 3 and 4.

If it is desired to produce only sharp output pulses 85 which are delayed with respect to the input pulses and to avoid producing also output pulses of opposite polarity which are in synchronism with the input pulses as in the circuit depicted in Fig. 4, there may be employed an output pulse generator 4 as shown in Fig. 5 to take the place of the pulse generator 4 shown in Fig. 4. In Fig. 5 there are employed three pentode electronic devices 301, 302 and 303. The control grid of tube 301 is connected through 100-ohm resistor 304 to plate 121 of condenser C and the cathode of this tube is connected to ground. The screen grid of this tube is connected through 47-ohm resistor 305 and 82,000-ohm resistor 306 to the 300-volt supply, the common terminal of these resistors being connected through 1.0 microfarad condenser 307 to ground. Anode voltage is supplied to the tube from the 300-volt source through a resistor 310. The anode of tube 301 is connected through a condenser 311 and an inductance element 312 to ground, the common terminal of the condenser and inductance element being connected through 100-ohm resistor 313 to the control grid of tube 302, the cathode of tube 302 being connected to ground. Anode voltage from the 300-volt source is supplied to tube 302 through a 27,000-ohm resistor 314. Screen grid voltage is supplied to the tube through 0.12 megohm resistor 315 and 47-ohm resistor 316, the common terminal of resistors 315 and 316 being connected through 0.1 microfarad condenser 317 to ground. The anode of tube 302 is connected through 100-micromicrofarad condenser 318 and 100-ohm resistor 320 to the control grid of tube 303 and the 0.27 megohm resistor 319 connects the common terminal of resistor 320 and condenser 318 to ground. Anode voltage is supplied to tube 303 from the 300-volt source through 0.1-megohm resistor 321. Voltage dividing resistors 322 and 323 of 0.12 megohm and 10,000-ohm resistance, respectively, are connected in series across the 300-volt supply, resistor 323 being shunted by 1.0 microfarad condenser 324. The cathode of tube 303 is connected to the common terminal of resistors 322 and 323 and the screen grid of the tube is connected through 47-ohm resistor 325 to the positive 300-volt terminal. The anode of the tube is connected through 0.01 microfarad condenser 326 to the output terminal 328 and through 1-megohm resistor 327 to ground, the other output terminal 329 being grounded.

When an input reference pulse 10 is applied to the start-stop circuit 2, with the result that the plate 121 of condenser C suddenly goes negative with respect to ground, tube 301 is cut off and condenser 311 is charged from the 300-volt source through a circuit comprising resistor 310 and the grid-cathode resistance of tube 302. The resistance $r$ of this resistor and the capacitance $c$ of condenser 311 should be such that the time constant $rc$ is less than half the minimum delay, that is $$rc < \frac{\text{minimum}}{2}$$

so that the condenser may be charged nearly to the supply voltage before the time $t$ when the charge on condenser C is reduced to zero with the result that tube 301 becomes conducting. The inductance L of inductance element 312, the capacity $c$ of condenser 311 and the anode-cathode resistance $r_p$ of tube 301 when the tube is conducting in the saturation region should be such that $$\sqrt{\frac{L}{c}} > r_p$$

so that oscillatory discharge of condenser 311 will take place. During the first quarter cycle of this oscillation the grid of tube 302 will be made negative with respect to ground, cutting off tube 302. After the first quarter cycle of this oscillation, the grid of tube 302 is driven positive and the grid current drawn damps the remainder of the oscillation. A positive pulse having a duration of $t_p$ will be produced at the anode of tube 302 and will be impressed upon the grid of tube 303 to produce a negative pulse having this duration at the output terminal 328. The duration of this output pulse will be approximately given by $$t_p = \frac{\pi}{2}\sqrt{LC}$$

What is claimed is:

1. Means for producing a voltage pulse the leading edge of which is delayed with respect to the leading edge of a reference pulse, said means comprising a circuit having capacitance and resistance in series through which current may flow to change the voltage to which said capacitance is charged, means for initiating the flow of current in said circuit under control of, and substantially coincidentally with the application of the leading edge of said reference pulse to said means to cause to be produced across two points of said circuit a voltage which changes from an initial value of one polarity to a final value of opposite polarity, and means under control of said voltage for producing the leading edge of said delayed pulse at the time when said voltage is substantially equal to zero.

2. Means for producing a voltage pulse which is delayed with respect to the leading edge of a reference pulse comprising a source of unidirectional voltage, a circuit comprising resistance and a condenser, means for initially charging said condenser to a potential difference substantially equal to the voltage of said source, means for initiating a current flow in said circuit under control of, and substantially coincidentally with the application of the leading edge of said reference pulse to said means to cause said condenser to be discharged and, to some extent at least, charged in the reverse direction, and means responsive at the time when the potential difference across said condenser reaches substantially zero voltage for producing said delayed pulse.

3. Apparatus for producing a series of similar pulses which are delayed with respect to corresponding pulses of a series of similar reference pulses comprising a current path having resistance and capacitance, means responsive to each of said reference pulses for initiating current flow in said path coincidentally with each reference pulse to cause the charge on said capacitance to decrease to a minimum value during a time interval starting at the time of said reference pulse and to increase during the time interval starting at the time that said minimum charge is reached, means connected to said path for producing said series of delayed pulses substantially at times when the charge on said capacitance reaches said minimum value and means for varying the delay between reference pulses and corresponding delayed pulses, said means comprising means for varying the rate at which the charge on said condenser is decreased to said minimum value.

4. Apparatus for producing a series of similar pulses which are delayed with respect to corresponding pulses of a series of similar reference pulses comprising a current path having resistance and reactance, means responsive to each of said reference pulses for causing current to flow in said path and thereby causing the voltage drop across said reactance to decrease to a minimum value during a time interval starting at the time of each reference pulse and to increase during a time interval starting at the time that said minimum voltage is reached, means connected to said path for producing said series of delayed pulses substantially at times when the voltage drop across said reactance reaches said minimum value and means for varying the delay between reference pulses and corresponding delayed pulses, said means comprising means for varying the time constant of said current path.

5. Apparatus for producing an output pulse which is delayed with respect to a reference input pulse which comprises a first electronic device having an anode, a cathode and a control electrode, a first circuit comprising a source of anode current connecting the anode and cathode of said device, a first current path connecting the anode and cathode of said device comprising a first reactor and a first resistor, a second electronic device having an anode, a cathode and a control electrode, a second circuit comprising a source of anode current connecting the anode and cathode of said second device, a second current path connecting the anode and cathode of said second electronic device comprising a second reactor and a second resistor, means for impressing a pulse upon the control electrode with respect to the cathode of said first electronic device for interrupting the anode current therein and for causing current to flow in said first current path, a third circuit connecting the control electrode and cathode of said second device comprising a portion of said first current path, the anode-cathode resistance of said second device being changed in response to change of current in said first current path and the current in said second path being changed in response to resistance change of the anode-cathode path of said second device, and means for producing said output pulse when the current in said second path reaches a certain amplitude.

6. Apparatus in accordance with claim 5 in which said reactors are condensers and in which said output pulse is produced when the current through said second current path is reduced substantially to zero.

7. Apparatus for producing an output pulse which is delayed with respect to a reference input pulse comprising two circuits, the one circuit having a first portion comprising a first condenser and a first resistor directly connected in series and the other circuit having a second portion comprising a second condenser and a second resistor directly connected in series, a source of current in each of said circuits, a first and a second electronic device each having an anode, a cathode, and a control electrode, said first electronic device being normally conducting and said second electronic device being normally nonconducting, a first current path comprising the anode-cathode path of said first electronic device connected in shunt with respect to said first circuit portion, a second current path comprising the anode-cathode path of said second electronic device connected in shunt with respect to said second circuit portion, a circuit connecting the control electrode and cathode of said second electronic device comprising said first resistor, means for impressing upon the control electrode with respect to the cathode of said first device a reference pulse for causing a resistance change of said first device to produce a change in voltage drop across said first resistor, thereby causing the resistance of said second device to change to vary the voltage drop across said second resistor, and means responsive to the voltage drop across said second resistor for producing said delayed output pulse substantially at the time that the varying voltage drop across said second resistor reaches zero.

8. Appartus in accordance with claim 7 in which the product of the resistance and capacitance of said first circuit portion is substantially equal to the product of resistance and capacitance of said second circuit portion and in which means are provided for simultaneously similarly varying the product of resistance and capacitance of said first and second circuit portions to vary the delay of said output pulse with respect to said input pulse.

9. In combination, a first and a second electronic device each comprising a cathode, an anode, and a control electrode, a source of anode current for said devices, one of said devices being normally conducting and the other of said devices being normally non-conducting, means for causing to be impressed upon the control electrode of one of said devices with respect to its cathode a potential for changing said one device from a conducting to a non-conducting state and for substantially simultaneously causing to be impressed upon the control electrode of the other of said devices with respect to its cathode a potential for changing said other device from a non-conducting to a conducting state, a condenser, a first and a second resistor, a circuit comprising said current source, said condenser, said first resistor and the anode-cathode path of said first device through which current flows to change the charge on said condenser when said first device is conducting, a circuit comprising said current source, said condenser, said second resistor and the anode-cathode path of said second device through which current flows to change the charge on said condenser when said second device is conducting, and means for utilizing the charge on said condenser to initiate the production of a pulse which is delayed with respect to the starting of conduction in one of said devices and which precedes the succeeding conduction period of the other of said devices, the time of initiation of said pulse being determined by the time constant of one of said circuits, said utilization means comprising a third electronic device having an anode, a cathode and a control electrode, and a circuit including said condenser connecting the control electrode and cathode of said third electronic device for changing said third device from a conducting to a non-conducting state and vice versa according to the charge on said condenser.

10. In combination, a first and a second electronic device each having an anode, a cathode and a control electrode, a current source, a condenser, a first and a second resistor, a circuit comprising said current source, said condenser, said first resistor and the anode-cathode path of said first electronic device through which current flows to change the voltage to which said condenser is charged when said first device is conducting and said second device is non-conducting, a circuit comprising said current source, said condenser, said second resistor and the anode-cathode path of said second device through which current flows to change the voltage to which said condenser is charged when said second device is conducting and said first device is non-conducting, means for causing said electronic devices to become conducting alternately, said last-mentioned means comprising means for intermittently impressing upon the control electrode of said first electronic device with respect to its cathode a potential for causing said first device to change from a normally conducting to a non-conducting state, and means responsive to said change of said first device from the conducting to the non-conducting state for impressing upon the control electrode of said second electronic device a potential for causing said second device to change from a normally non-conducting to a conducting state, and utilization means responsive to the voltage to which said condenser is charged to initiate the production of a pulse which is delayed with respect to the starting of conduction in one of said devices and which precedes the succeeding conduction period of the other of said devices, the time of initiation of said pulse being determined by the time constant of one of said circuits, said utilization means comprising a third electronic device having an anode, a cathode and a control electrode, and a circuit including said condenser connecting the control electrode and cathode of said third electronic device for changing said third device from a conducting to a non-conducting state and vice versa according to the charge on said condenser.

11. In combination, a source of unidirectional current, two electronic devices each having an anode, a cathode and a control electrode, a condenser, two resistors, a circuit comprising said current source, the anode-cathode path of one of said electronic devices and one of said resistors, a second circuit comprising said current source, the anode-cathode path of the other of said electronic devices and the other resistor, means for connecting the terminals of said condenser to the anodes of said electronic devices respectively, means for causing said electronic devices to become conducting alternately for controlling the charge on said condenser, said last-mentioned means comprising means for intermittently impressing upon the control electrode of said first electronic device with respect to its cathode a potential for causing said first device to change from a normally conducting to a non-conducting state, and means responsive to said change of said first device from the conducting to the non-conducting state for impressing upon the control electrode of said second electronic device a potential for causing said second device to change from a normally non-conducting to a conducting state, a third electronic device comprising an anode, a cathode and a control electrode, and a circuit comprising said condenser connecting the control electrode and cathode of said third electronic device for changing said third device from a conducting to a non-conducting state and vice versa according to the charge on said condenser.

12. A combination in accordance with claim 11 in which the time constant of one of said circuits may be varied to control the delay interval between the time at which one of said two first-mentioned electronic devices becomes conducting and a later time at which said third electronic device becomes conducting.

13. Apparatus for producing a series of output pulses which are in synchronism with a series of similar input pulses but out of phase therewith by a desired delay interval comprising a first and a second electronic device each having an anode, a cathode and a control electrode, the potential of the control electrode of one of said devices being normally such with respect to its cathode potential that the device is conducting, the potential of the control electrode of the second of said devices being normally such with respect to its cathode that the device is normally non-conducting, means responsive to each input pulse for causing said first device to become non-conducting and said second device to become conducting for a predetermined period at the end of which the second device returns to the non-conducting state and the first device to the conducting state, a unidirectional voltage source, means comprising a first resistor for connecting the anode of said first device to the positive terminal of said voltage source, means comprising a second resistor for connecting the anode of said second device to said positive voltage terminal, means for connecting the cathodes of said devices to the negative voltage terminal, a condenser the terminals of which are connected to said anodes respectively, said condenser being charged prior to said predetermined period by current from said source flowing through a circuit comprising said condenser, said second resistor and the anode-cathode path of said first electronic device, and said condenser being discharged and recharged in the opposite direction during said predetermined period starting at the time of each input pulse due to current flowing in a circuit comprising said voltage source, said condenser, said first resistor and the anode-cathode path of said second electronic device, and means for producing said output pulses at times when the charge on said condenser is reduced substantially to zero during said predetermined periods, said means comprising a third electronic device having an anode, a cathode and a control electrode, means for connecting said control electrode to the anode of said first electronic device and means for connecting said cathode to the negative terminal of said voltage source, said third electronic device being conducting during periods when the first electronic device is conducting and said third electronic device becoming non-conducting when the charge on said condenser is reduced substantially to zero.

14. Apparatus in accordance with claim 13 in which means are provided for varying the time constant of the circuit comprising the first resistor and the condenser for controlling the delay interval between said input pulses and corresponding output pulses.

15. Apparatus for producing a series of output pulses which are in synchronism with a series of similar input pulses but which are delayed with respect thereto by an amount which is greater than the duration of each pulse but less than the interval between two successive pulses of a series which comprises a first and a second electronic device each having an anode, a cathode and a control electrode, a source of unidirectional voltage, means for connecting each of said cathodes to the negative terminal of said voltage source, a first path comprising a first resistor for connecting the positive voltage terminal to the anode of said first electronic device, a second path comprising a second resistor and a condenser in series therewith for connecting the positive voltage terminal to the anode of said first electronic device, means for connecting the control electrode of said second electronic device to the common terminal of said second resistor and said condenser, said condenser being charged due to current flowing in a circuit comprising said condenser, said voltage source, said first resistor and the control electrode-cathode path of said second electronic device, means for biasing the control electrode of said first electronic device with respect to its cathode for causing said device to be normally non-conducting, means for causing said first electronic device to become conducting in response to each of said input pulses over a period commencing substantially at the start of the input pulse and ending during an interval between each input pulse and a succeeding input pulse, current flowing during each conducting period in a circuit comprising said voltage source, said second resistor, said condenser and the anode-cathode path of said first electronic device to change the charge on said condenser, said second electronic device being initially made non-conducting substantially coincidentally with each input pulse and after a delay interval becoming conducting when the charge on said condenser is reduced substantially to zero due to the current in said last-mentioned circuit and means connected to the anode-cathode path of said second electronic device responsive to a change from a non-conducting to a conducting condition of said second electronic device for producing said output pulses.

16. Apparatus according to claim 15 in which the time constant of the circuit comprising said second resistor and said condenser may be varied for changing the delay interval between the input pulses and correspnding output pulses.

17. Means for deriving a second voltage pulse uder control of a first voltage pulse with a desired delay between the leading edges of the two pulses comprising a source of direct current, a capacitative element for storing energy from said source, circuit control means under control of the leading edge of said first pulse for establishing a circuit through which said stored energy discharges through said source in aiding relation to said source to set up a unidirectional current flow in said circuit and through which current continues to flow after said discharge to recharge, to some extent at least, said capacitative element from said source in the reverse direction, a resistance element in said circuit in series with said capacitative element and said source through which resistance element said discharge and recharge current flows, and means for producing an abrupt change of voltage to form the leading edge of said second pulse at the termination of a period beginning with said discharge and equal to the said desired delay, said means at the termination of said period causing said abrupt change of voltage under control of the potential difference between one terminal of said capacitative element and a fixed reference potential.

18. The combination of claim 17 in which said circuit control means is an electronic device having an anode, a cathode and a current control element, said device having low impedance when saturation current flows therein, said first pulse acting upon said control element to cause an abrupt change of impedance of said device from substantially infinite value to substantially its minimum obtainable value, said fixed reference potential being that of the negative terminal of said source and the cathode of said electronic device and the terminals of said capacitative elements being connected respectively to the anode of said electronic device and said resistance element, whereby said potential difference which controls the generation of said second pulse is substantially equal to the potential difference across said capacitative element during said discharge.

BERNARD M. OLIVER.

REFERENCES CITED

The following references are of record in the file of this patent:

UNITED STATES PATENTS

| Number | Name | Date |
|---|---|---|
| 2,312,491 | Siewert | Mar. 2, 1943 |
| 2,226,706 | Cawein | Dec. 21, 1940 |
| 2,248,975 | Faudell | July 15, 1941 |